(12) United States Patent
Bejerasco et al.

(10) Patent No.: US 11,080,342 B2
(45) Date of Patent: Aug. 3, 2021

(54) METHOD AND APPARATUS FOR WEB PAGE CONTENT CATEGORIZATION

(71) Applicant: F-Secure Corporation, Helsinki (FI)

(72) Inventors: Christine Bejerasco, Helsinki (FI); Karmina Aquino, Helsinki (FI)

(73) Assignee: F-Secure Corporation, Helsinki (FI)

( * ) Notice: Subject to any disclaimer, the term of this patent is extended or adjusted under 35 U.S.C. 154(b) by 870 days.

(21) Appl. No.: 14/412,717

(22) PCT Filed: Jun. 25, 2013

(86) PCT No.: PCT/EP2013/063287
§ 371 (c)(1),
(2) Date: Jan. 5, 2015

(87) PCT Pub. No.: WO2014/005885
PCT Pub. Date: Jan. 9, 2014

(65) Prior Publication Data
US 2015/0161259 A1 Jun. 11, 2015

(30) Foreign Application Priority Data
Jul. 6, 2012 (GB) .................................... 1212087

(51) Int. Cl.
*G06F 16/951* (2019.01)
*G06F 16/9535* (2019.01)
(Continued)

(52) U.S. Cl.
CPC .......... *G06F 16/951* (2019.01); *G06F 16/908* (2019.01); *G06F 16/953* (2019.01); *G06F 16/9535* (2019.01); *G06F 21/6227* (2013.01)

(58) Field of Classification Search
CPC ......... G06F 17/30864; G06F 17/30867; G06F 21/6227; G06F 16/908; G06F 16/951; G06F 16/953; G06F 16/9535
See application file for complete search history.

(56) References Cited

U.S. PATENT DOCUMENTS

| 6,266,664 B1 | 7/2001 | Russell-Falla et al. .......... 707/5 |
| 6,684,240 B1 * | 1/2004 | Goddard ................ H04N 7/163 348/E7.061 |

(Continued)

FOREIGN PATENT DOCUMENTS

| JP | 2007-128119 A | 5/2007 |
| WO | WO 2007/063547 A2 | 6/2007 |

OTHER PUBLICATIONS

Lee et al., Neural Networks for Web Content Filtering, Sep. 2002, IEEE, v.17, issue 5, pp. 48-57 (Year: 2002).*

*Primary Examiner* — Taelor Kim
(74) *Attorney, Agent, or Firm* — Harrington & Smith

(57) ABSTRACT

In accordance with an example embodiment of the present invention, there is provided an apparatus, including at least one processor; and at least one memory including computer program code the at least one memory and the computer program code configured to, with the at least one processor, cause the apparatus to perform at least the following: detecting a listing of web content elements provided by a web search engine, the web content elements relating to web pages retrieved by the web search engine; analyzing one or more web content elements of the detected listing; and categorizing the content of one or more web pages on the basis of the analysis.

10 Claims, 7 Drawing Sheets

(51) Int. Cl.
  *G06F 16/908* (2019.01)
  *G06F 16/953* (2019.01)
  *G06F 21/62* (2013.01)

(56) References Cited

U.S. PATENT DOCUMENTS

| | | | |
|---|---|---|---|
| 8,078,625 B1* | 12/2011 | Zhang | G06F 16/954 |
| | | | 707/748 |
| 2006/0004716 A1* | 1/2006 | Hurst-Hiller | G06F 16/9535 |
| 2008/0104688 A1* | 5/2008 | Paskett | H04L 63/10 |
| | | | 726/12 |
| 2008/0313173 A1 | 12/2008 | Popper | 707/5 |
| 2010/0153364 A1 | 6/2010 | Kirby | 707/722 |
| 2011/0126292 A1 | 5/2011 | Ferg et al. | 726/26 |

\* cited by examiner

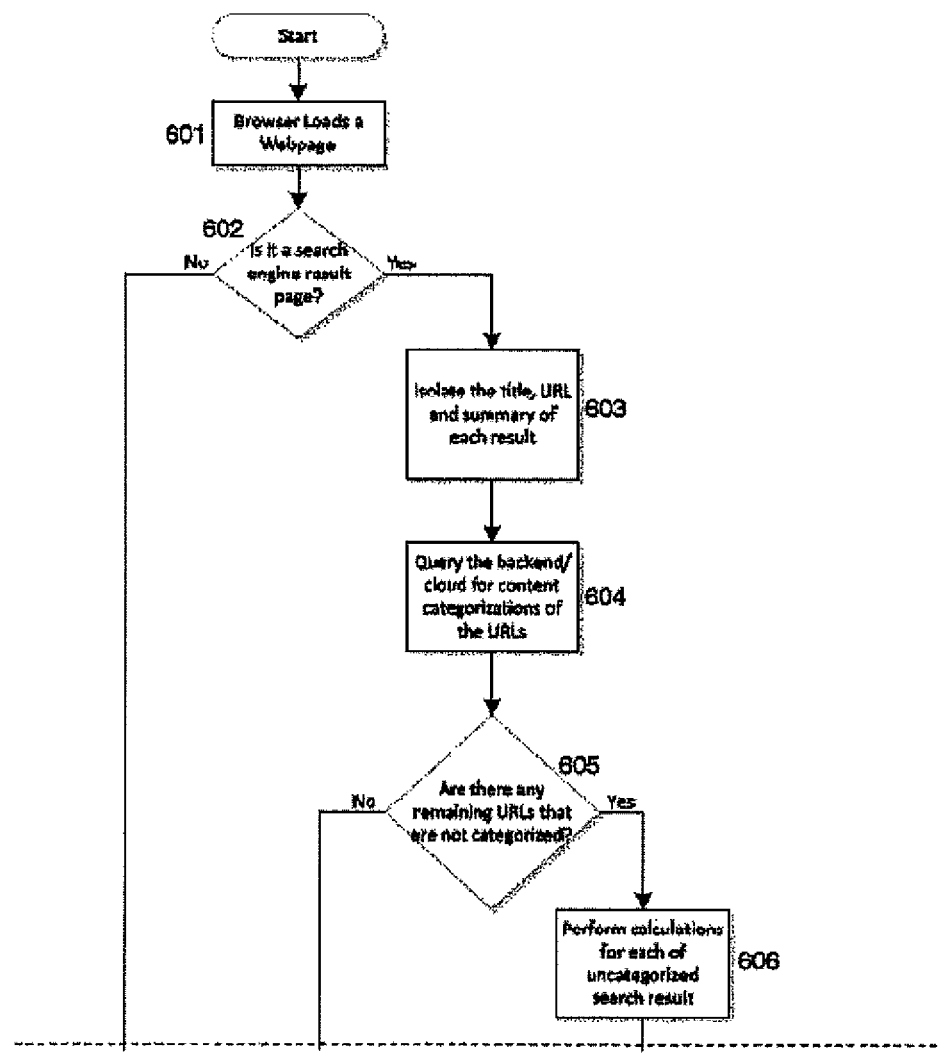
FIG. 6 view 1

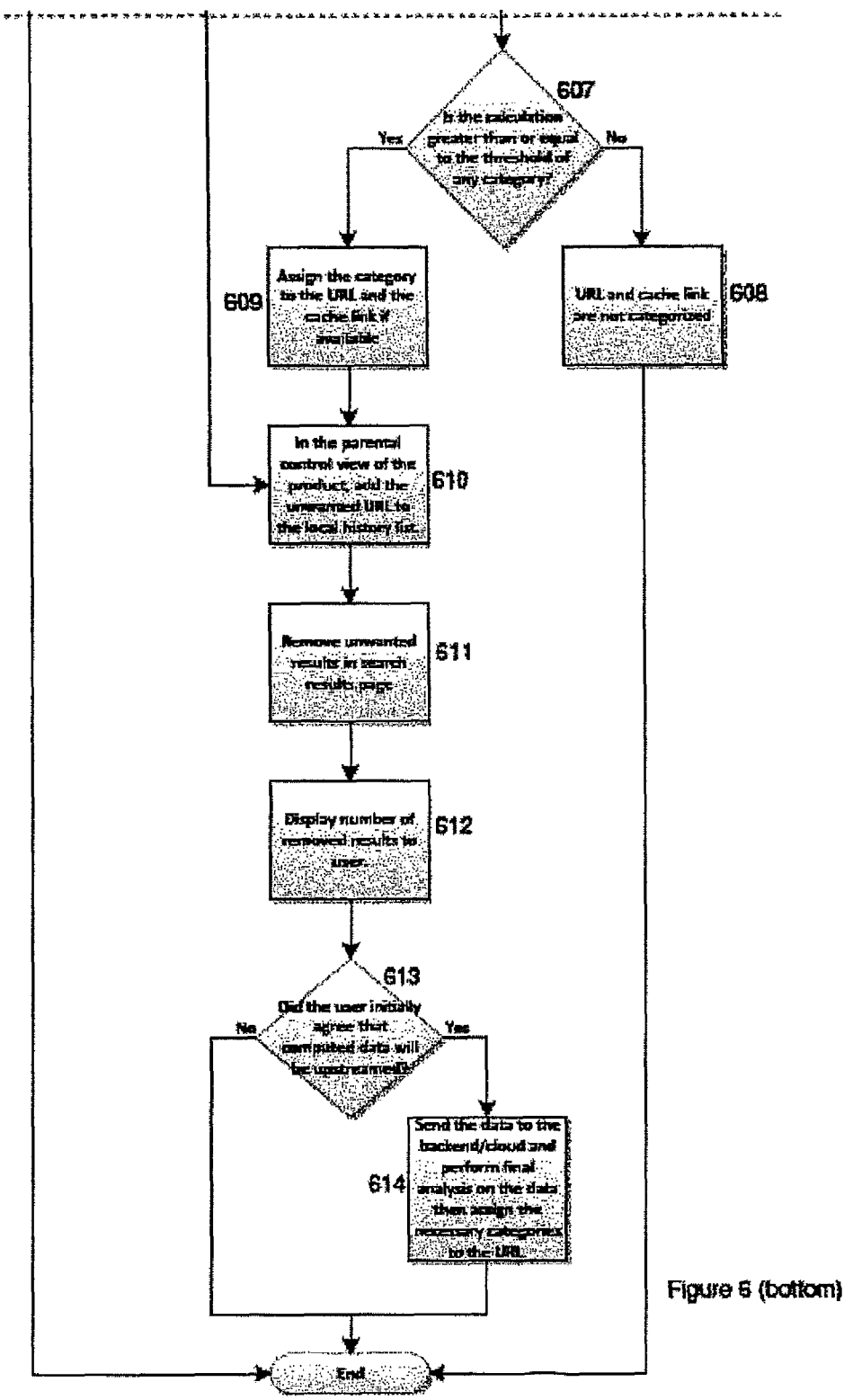
FIG. 6 view 2 (continued)

METHOD AND APPARATUS FOR WEB PAGE CONTENT CATEGORIZATION

TECHNICAL FIELD

The exemplary and non-limiting embodiments of the present application relate generally to methods, apparatuses and computer programs and, more specifically, to the field of web page content categorization.

BACKGROUND

New web sites that distribute discretionary content are continuously being searched and indexed to provide a safer Internet browsing experience. For example, parents want to control their children's Internet browsing to protect them from harmful web content. Preventing web pages from distributing malicious content is also more and more important.

Typically, uniform resource locators (URL) of the requested web pages are compared to the database of unwanted/indexed URLs. However, at the current rate at which new web pages are created daily, the categorizing of web pages, for example, for parental control purposes, cannot keep up. There are also solutions where a content scanner on a client computer checks every web page by analyzing the page content itself. However, these solutions are slow and they require more system resources.

Therefore, an effective web content categorization that does not sacrifice speed is needed.

SUMMARY

Various aspects of examples of the invention are set out in the claims.

According to a first aspect of the present invention, a method for web page content categorization is provided, comprising: detecting a listing of web content elements provided by a web search engine, the web content elements relating to search results produced by the web search engine; analyzing one or more web content elements of the detected listing; and categorizing the content of one or more web pages on the basis of the analysis.

According to a second aspect of the present invention, there is provided a apparatus, comprising: at least one processor; and at least one memory including computer program code the at least one memory and the computer program code configured to, with the at least one processor, cause the apparatus to perform at least the following: detecting a listing of web content elements provided by a web search engine, the web content elements relating to search results produced by the web search engine; analyzing one or more web content elements of the detected listing; and categorizing the content of one or more web pages on the basis of the analysis.

According to a third aspect of the present invention, there is provided a computer program product comprising a computer-readable medium bearing computer program code embodied therein for use with a computer, the computer program code comprising: code for detecting a listing of web content elements provided by a web search engine, the web content elements relating to search results produced by the web search engine; code for analyzing one or more web content elements of the detected listing; and code for categorizing the content of one or more web pages on the basis of the analysis.

According to a fourth aspect of the present invention, there is provided a server system, comprising: at least one processor; and at least one memory including computer program code the at least one memory and the computer program code configured to, with the at least one processor, cause the server system to perform at least the following: receiving, from a client computer, a listing of web content elements provided by a web search engine, the web content elements relating to search results produced by the web search engine; analyzing one or more web content elements of the detected listing; and categorizing the content of one or more web pages on the basis of the analysis.

BRIEF DESCRIPTION OF THE DRAWINGS

The accompanying drawings provide a more complete understanding of the embodiments of the present invention according to the following descriptions:

FIG. 6 view 1 and FIG. 6 view 2 (continued) show a flow chart of a method in accordance with example embodiments of the invention.

DETAILED DESCRIPTION OF THE DRAWINGS

Example embodiments of the present invention are later described in more detail with reference to the accompanying drawings, in which some embodiments of the invention are shown. The invention may be embodied in many different forms and should not be construed as limited to the embodiments presented here. Although the specification may refer to "an", "one", or "some" embodiment in several locations, this does not necessarily mean that each such reference is to the same embodiment, or that the feature only applies to a single embodiment. Single features of different embodiments may also be combined to provide other embodiments.

The present invention can apply to any terminal, server, corresponding component, or to any communication system or combination of different communications systems that support the required functionality. Due to the rapid development of the specifications of computer systems and protocols that are used, all words and expressions should be interpreted broadly; they are intended only to explain the embodiment.

The following description relates to the categorization of web page content. This may apply to any type of content, such as data, data blocks, complete files or portions of files, links and cache links.

Figure 1:
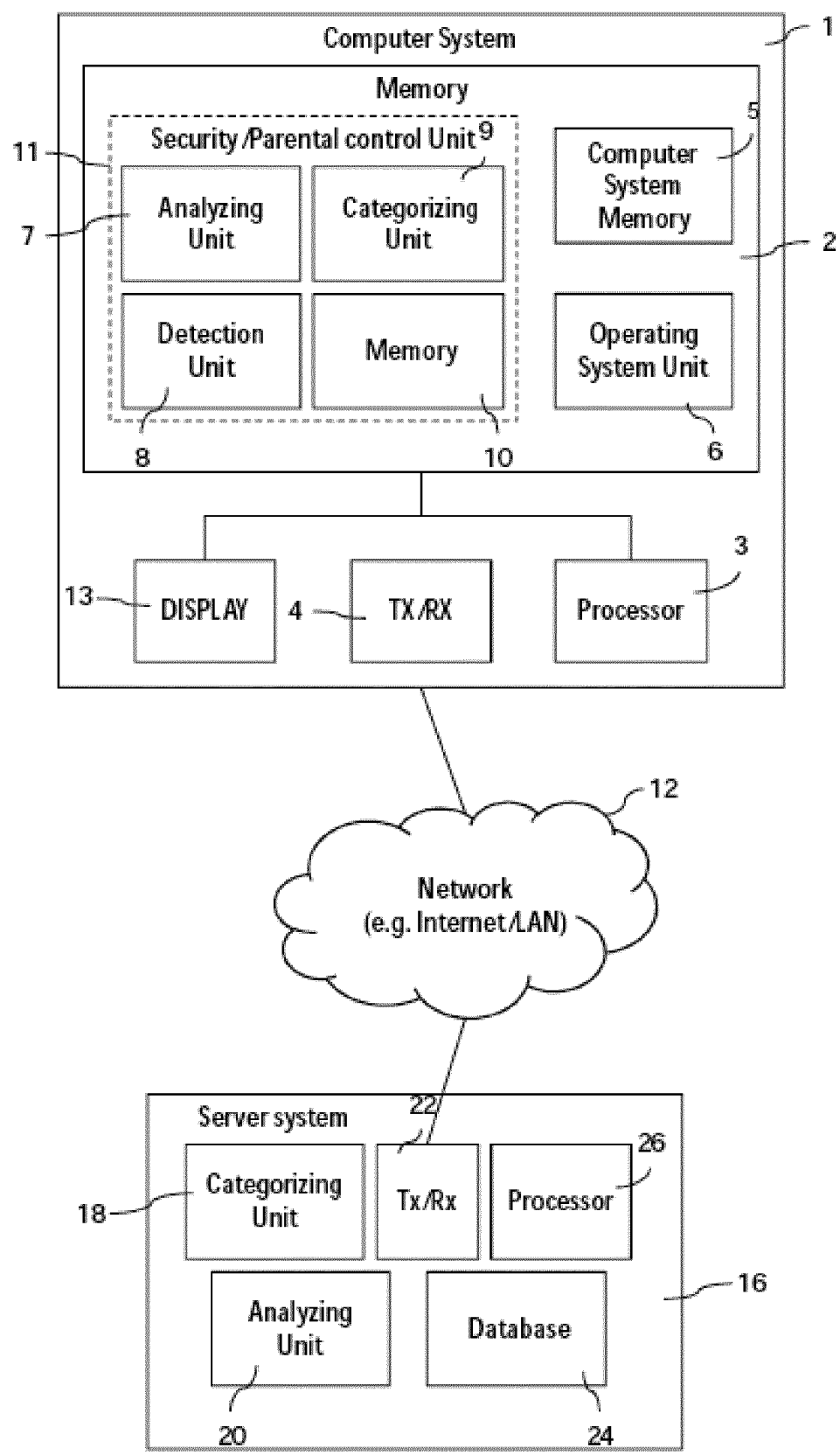
FIG. 1 shows a simplified block diagram that illustrates an example of apparatuses according to the invention.

FIG. 1 illustrates a general example of apparatuses in which the embodiments of the invention may be applied. It only shows the elements and functional entities that are required for understanding the arrangement according to an embodiment of the invention. Other components have been omitted for the sake of simplicity. The implementation of the elements and functional entities may vary from that shown in FIG. 1. The connections shown in FIG. 1 are logical connections, and the actual physical connections may be different. It is apparent to a person skilled in the field that the arrangement may also comprise other functions and structures.

FIG. 1 shows an example of a computer system 1 that is suitable for implementing the methods that are described below. The computer system 1 can be implemented as a combination of computer hardware and software. The computer system 1 comprises a memory 2, a processor 3 and a transceiver 4. The memory 2 stores the various programs or executable files that are implemented by the processor 3, and provides a computer system memory 5 that stores any data required by the computer system 1.

The programs or executable files that are stored in the memory 2, and implemented by the processor 3, can include an operating system unit 6. The memory 2 also provides a memory 10 that is used by a detection unit 8, an analyzing unit 7 and a categorizing unit 9. The detection unit 8, analyzing unit 7 and categorizing unit 9 can be sub-units of a security/parental control unit 11, for example. The transceiver 4 is used to communicate over a network 12 such as a LAN, the Internet, or a mobile broadband network. Typically, the computer system 1 may be a personal computer (PC), laptop, tablet computer, or mobile phone, or any other suitable device.

The example of FIG. 1 also shows a server system 16 that may communicate with the computer system 1 and other client terminals. The server system 16 may comprise a transceiver 22 and a processor 26. The server system 16 may also comprise a database 24, and analyzing unit 20 and a categorizing unit 18. The server system 16 may belong to, for example, an Internet service provider, a wireless service operator, mobile network operator, or a security service provider.

It should be noted that the computer system 1 and the server system 16 are only examples of apparatuses or systems, and that they may have more or fewer components than shown, may combine two or more components, or may have a different configuration or arrangement of the components. For example, in some embodiments the security/parental control unit 11 forms a part of the server system 16.

Figure 2:
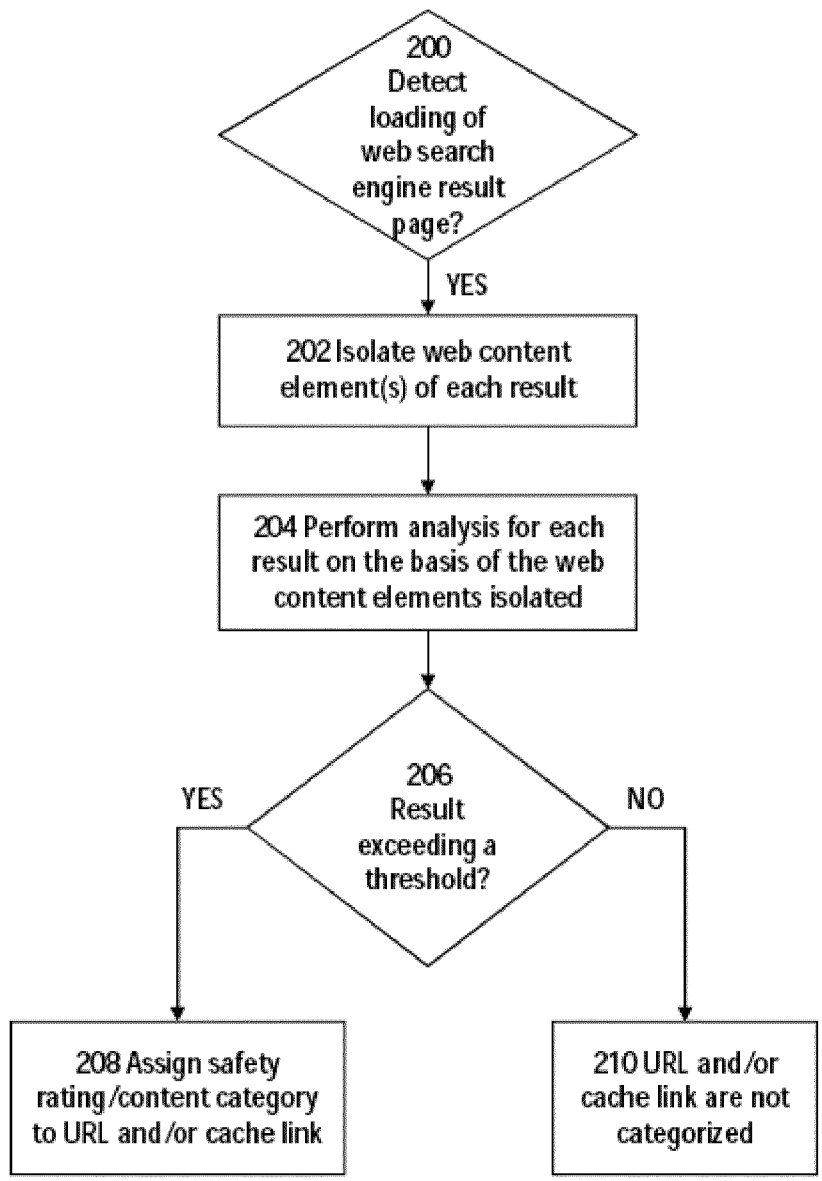
FIG. 2 shows an example of a method.

FIG. 2 is a flow diagram that shows an example of a process.

Figure 4:
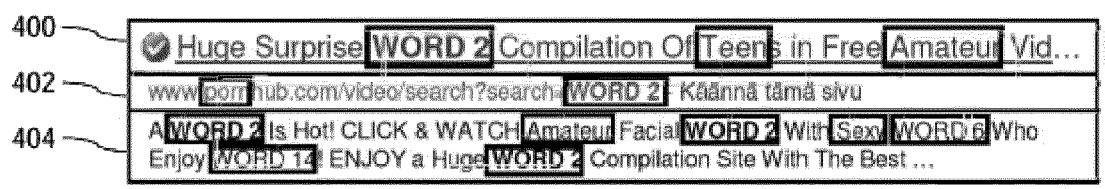
FIG. 4 shows an example of a sample search results shows another example of a method.

In 200, a detection unit 8 detects a listing of web content elements provided by a web search engine on the display 13. The web search engine searches information on the World Wide Web and presents the search results. The search results may relate to web pages, images, information and other types of files retrieved by the web search engine. "Search result" is used herein to refer to the set of web content elements provided by the web search engine to the web browser. (e.g. as shown in FIG. 4). The search results may each comprise a title, a hyperlink, a text URL, and a summary text for the web page.

In 202, one or more web content elements of the detected listing are isolated for analysis. In an embodiment, at least one or more of the following web content elements: a title, a link, and a summary text are isolated.

In 204, an analysis is performed for the isolated web content elements by an analyzing unit 7, 20. The analysis may be performed by the computer system 1 or by the server system 16.

In 206, it is detected whether the results from the analysis exceeds a predetermined threshold of a specified safety rating or content categorization. If the threshold is exceeded or reached, a safety rating or a category may be assigned to the URL and/or cache link of the related web page in 208. For example, an unwanted category may relate to any of the following categories, however not limited to them: offensive, violence, adult content, criminal, illegal content, drugs, gambling, nudity, pornography, hate, racism, weapons. The content of one or more web pages may be categorized on the basis of the analysis.

In an embodiment, if the predetermined threshold is not exceeded and/or reached, then the URL and/or cache link is not assigned to any unwanted categories in 210. However, it is possible that this kind of content and/or these web pages are categorized according to specified predetermined, allowed categories. In an embodiment, an appropriate safety rating may always be assigned to the URL and/or cache link depending on the result of the analysis. In an embodiment, keywords or regular expressions detected on one or more of the search result elements may be used to identify if the search result is referring to something malicious. Keywords or regular expressions may, for example, be used to identifying suspicious content or scam sites.

Figure 3:
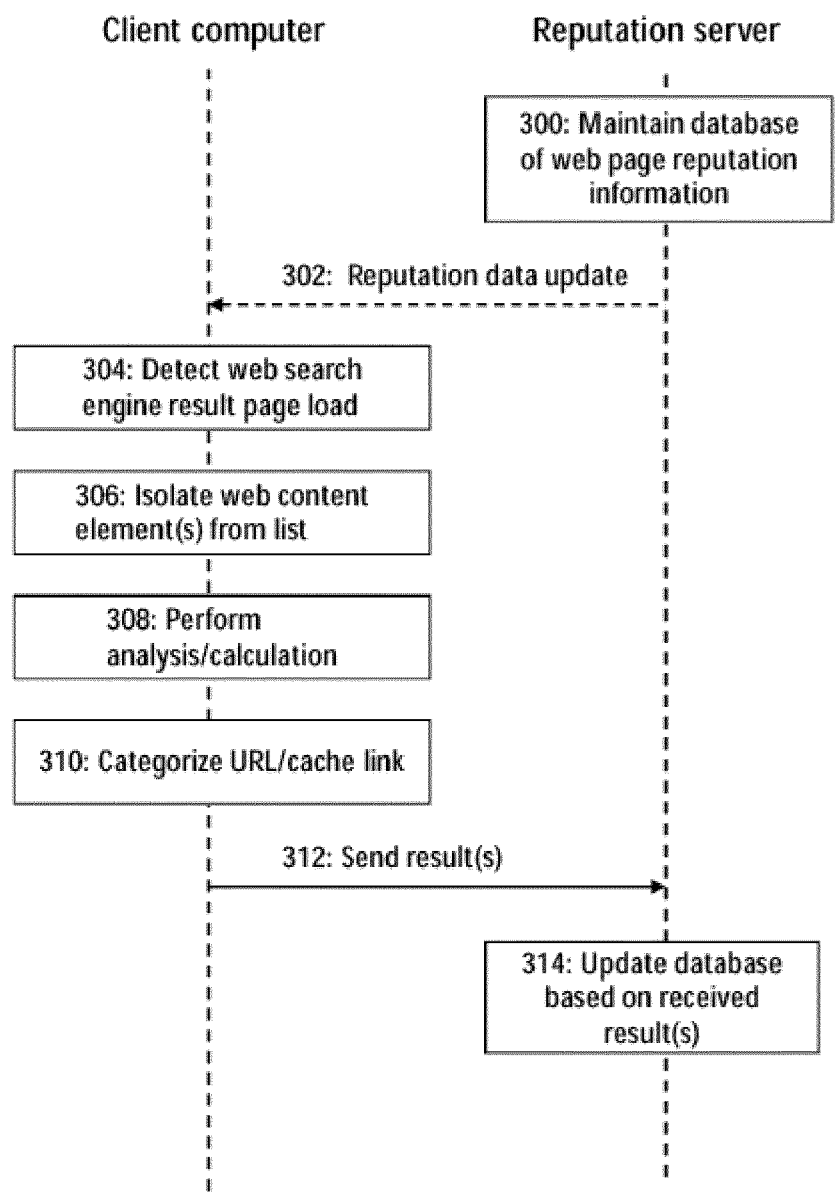
FIG. 3 is a signal sequence diagram showing an example according to an embodiment of the present invention.

FIG. 3 is a signal sequence diagram that shows another example of the process. At 300, a server system 16 maintains a database of web page reputation information. This database may comprise URLs and categorization information that is updated regularly. Updates may be based on web page analysis and/or reputation information that is received from other systems or client computers.

In 302, the client computer 1 of the server system 16 may download an update of reputation data that is related to web page categorization.

In 304, the client computer detects a web search engine result page that is being loaded. The search results pages can be identified because web search engines typically use a very similar structure. Any method for detecting if the resulting web page is a search engine result page can be employed. Examples of such methods are using the domain name and isolating support for the top 7 search engines or detecting search-engine like structure in HTML code as a search engine result. For example, the search engine result page typically has three different web content elements: a title, a summary text and a link.

In 306, the detection of the web search engine result page being loaded initiates the isolation of the web content elements from the result page list. The isolation may be started as soon as one or more results is detected. For example, the titles, links and summary texts can be isolated from the results when the search results are loaded.

In 308, the isolated web content elements are calculated and analyzed. In an embodiment, the calculation and analysis are based on keywords that are isolated from the title, link and/or summary text of each result of the web search engine results page. The keywords may also be used to apply weights depending on the web content element in which a keyword match is detected. The calculation may be performed purely on the client computer or as a query to a cloud-based server system that may produce the requested results.

The calculations may be simplistic or may utilize complex algorithms that may involve any data mining and classification techniques or both, depending on the implementation. The calculations may be performed on the web content elements to detect whether they comprise keywords matching predetermined keywords in specific categories. Different weights are assigned depending on the web content elements in which the keywords are found. For example, if a keyword match is found in the title, then a Title Keyword Match (TK) and a Title Keyword weight (TKw) may be applied. If a keyword match is found in the link itself, a Link Keyword Match (LK) and a Link Keyword Weight (LKw) may be applied. Finally, if the match is in the summary text, then a Summary Keyword Match (SK) and a corresponding Summary Keyword weight (SKw) may be applied. When the calculation is finished, the resulting value may then be compared to an accepted threshold for that particular category. For example, if the result is greater than or equal to the threshold, the category may be applied to the relating URL, and when the user clicks the particular search results, the URL will be categorized accordingly.

An example of a calculation of the total weight may be the following:

$$\text{Total Weight} = (TW^*((TK1^*TKw1)+(TK2^*TKw2)+ \ldots +(TKn^*TKwn)))+(LW^*((LK1^*LKw1)+(LK2^*LKw2)+ \ldots +(LKn^*LKwn)))+(SW^*((SK1^*SKw1)+(SK2^*SKw2)+ \ldots +(SKn^*SKwn)))$$

where TW is a title weight, TK1 is the title keyword match of the $1^{st}$ keyword, TKw1 is the title keyword weight of the $1^{st}$ keyword, TK2 is the title keyword match of the $2^{nd}$ keyword, TKw2 is the title keyword weight of the $2^{nd}$ keyword, TKn is the title keyword match of the $n^{th}$ keyword, TKwn is the title keyword weight of the $n^{th}$ keyword, LW is a link weight, LK1 is the link keyword match of the $1^{st}$ keyword, LKw1 is the link keyword weight of the $1^{st}$ keyword, LK2 is the link keyword match of the $2^{nd}$ keyword, LKw2 is the link keyword weight of the $2^{nd}$ keyword, LKn is the link keyword match of the $n^{th}$ keyword, LKwn is the link keyword weight of the $n^{th}$ keyword, SW is a text summary weight, SK1 is the summary keyword match of the 1st keyword, SKw1 is the summary keyword weight of the $1^{st}$ keyword, SK2 is the summary keyword match of the $2^{nd}$ keyword, SKw2 is the summary keyword weight of the $2^{nd}$ keyword, SKn is the summary keyword match of the $n^{th}$ keyword and SKwn is the summary keyword weight of the $n^{th}$ keyword.

The following use case example (sample calculation) assumes that we are evaluating a category, the name, threshold and element weights of which are defined below and available keywords of which are shown on Table 1.
i. Category: Adult
ii. Threshold: 200
iii. Title Weight (TW): 10
iv. Link Weight (LW): 5
v. Text Summary Weight (SW): 1

TABLE 1

Corresponding weights of Adult keywords in regular expression form (please note that inappropriate words have been replaced with WORD 1, WORD 2, etc. for the benefit of this example)**

| Weight: 10 | Weight: 7 | Weight: 4 | Weight: 1 |
|---|---|---|---|
| porn(\|\_\|-)?star | fetish | sex | teen |
| WORD 1 | xxx | porn | amateur |
| WORD 2 | WORD 6 | WORD 10 | WORD 14 |
| WORD 3 | WORD 7 | WORD 11 | sexy |
| WORD 4 | WORD 8 | WORD 12 | WORD 15 |
| WORD 5 | WORD 9 | WORD 13 | WORD 16 |

**Eg; for "porn(\|\_\|-)?star", a match may be "pornstar", "porn star", "porn-star" and "porn_star"

FIG. 4 shows an example of a sample search results that comprise three web content elements: a title 400, a link 402 and a summary text 404. Based on the keywords shown in Table 1, FIG. 4 shows the matches found. The keyword matches are marked with rectangles around the words. Table 2 shows the corresponding matches, total calculations and the result.

TABLE 2

Keyword matches, calculations and results

| Title | Weight | Link | Weight | Summary Text | Weight |
|---|---|---|---|---|---|
| WORD 2 | 10 | porn | 4 | WORD 2 | 10 |
| teen | 1 | WORD 2 | 10 | amateur | 1 |
| amateur | 1 | | | WORD 2 | 10 |
| | | | | sexy | 1 |
| | | | | WORD 6 | 7 |
| | | | | WORD 14 | 1 |
| | | | | WORD 2 | 10 |
| Total weight per element | 12 | | 14 | | 40 |
| Total *TW(10) | 120 | Total*LW(5) | 70 | Total*SW(1) | 40 |
| | | Total Weight 230 | | | |
| | | Adult Threshold 200 | | | |
| | | Result Adult | | | |

In 310, URL and/or a cache link is categorized based on the analysis and calculations. For example, based on the above example and results shown in Table 2, the relating web page is categorized as an Adult site.

In 312, the results of the categorization are also sent to the server system.

In 314, the server system updates its database on the basis of the received results.

Figure 5:
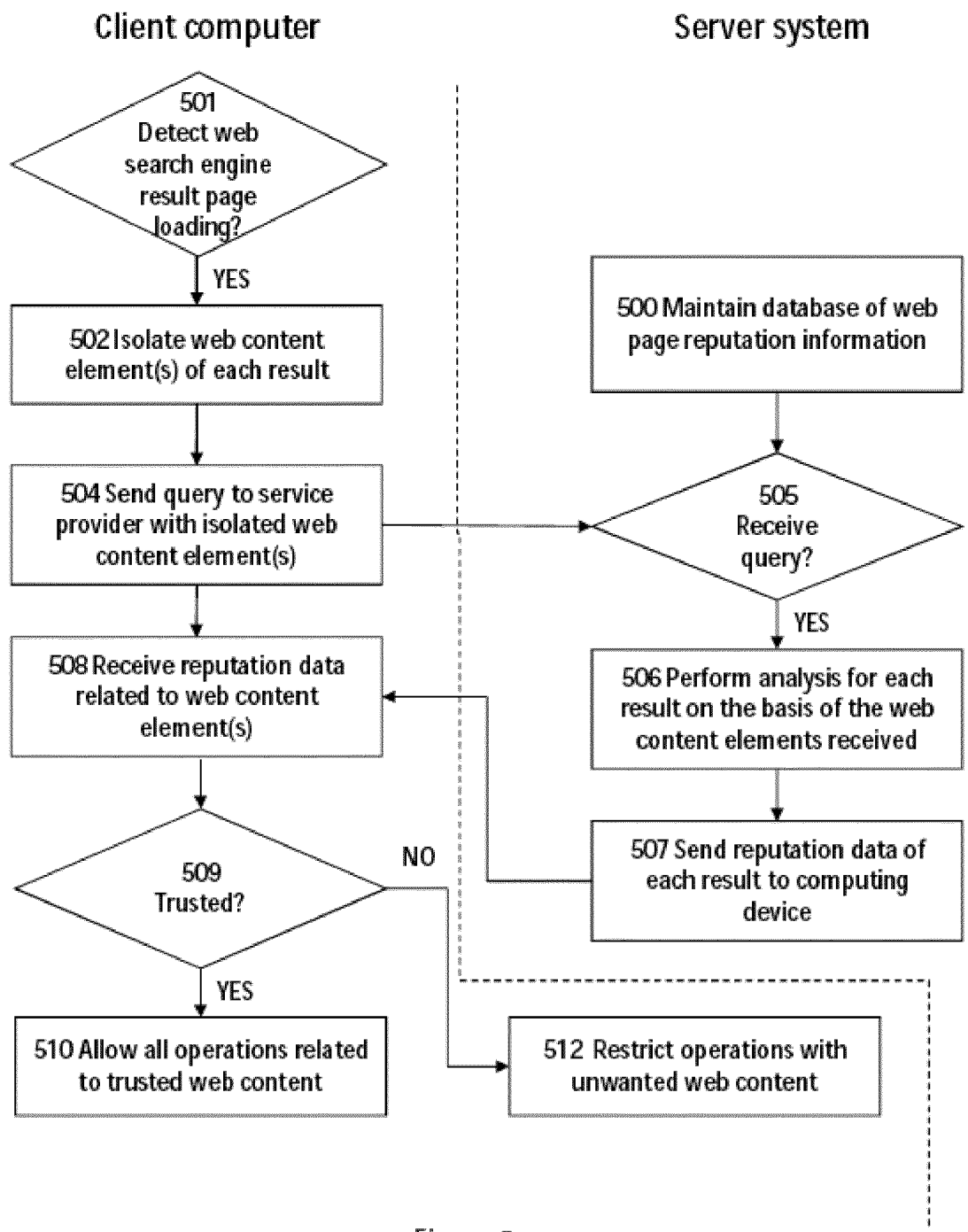
FIG. 5 shows another example of a method.

FIG. 5 is a flow diagram that shows another example of a method.

In 500, a server system, such as a security service provider, maintains a database of web page reputation information.

In 501, the client computer detects that a web search engine result page is being loaded.

In 502, the client computer isolates the web content element(s) of each result.

In 504, the client computer sends a query to the service provider with the isolated web content element(s). In an embodiment, the client computer may also send the web search engine result page information without isolating the web content element(s) from the results. In this case, the server system isolates the web content elements.

In 505, when the server system detects that it has received a query for categorizing web page content, 506 is entered.

In 506, the server system performs analysis for each result on the basis of the web content element information received with the query.

In 507, reputation data of each result is sent to the client computer. The reputation data may comprise the categorization information and/or indication of whether or not the relating web page can be trusted, or is unwanted.

In 508, the client computer receives the reputation data that is related to the web content element(s) and the related web pages.

In 509, the client computer determines whether a specific search result can be trusted on the basis of the received reputation data.

In case the client computer determines that a specific web page cannot be trusted, 512 is entered where operations with the unwanted web content may be restricted. Depending on the settings of the device, the user may not be able to access such content or an indication may be shown on the display of the device that warns the user about the unwanted content.

In case the client computer determines that a web page can be trusted, 510 is entered, where all operations related to the trusted web content can be allowed. It is also possible to show an indication of trust on the display after a specific web page has been determined as trusted.

FIG. 6 is a flowchart showing another example of a method performed on a client computer.

In 601, the browser loads a webpage.

In 602, the client computer determines whether the webpage is a search engine result page. If it is not, then the method terminates. If so, the method proceeds to step 603.

In 603, the client computer isolates the title, URL, and summary of each result on the search page.

In 604, the client computer queries the backend server (i.e. a server run by a reputation service provider) for content categorizations of the URLs.

In 605, the client computer determines whether there are any remaining URLs in the search listing that are uncategorized. If not, then the method skips to step 610. If so, the method proceeds to step 606.

In 606, the client computer performs calculations as described above for each uncategorized search result.

In 607, the client computer determines whether the results of the calculation is greater than or equal to a threshold for any content category. If not, the URL and cache link remain uncategorized (608) and the method terminates. If so, the method proceeds to step 609.

In 609, the client assigns the content category to the URL (and cache link if present).

In 610, the URL is added to the local history list. The history list may be kept for a predetermined period of time, and the user may be able to indicate items on the history list which are "false positives" so that the classification criteria can be updated and/or a report sent to the central reputation server.

In 611, the unwanted results are removed from the display of the search results page.

Figure 7:
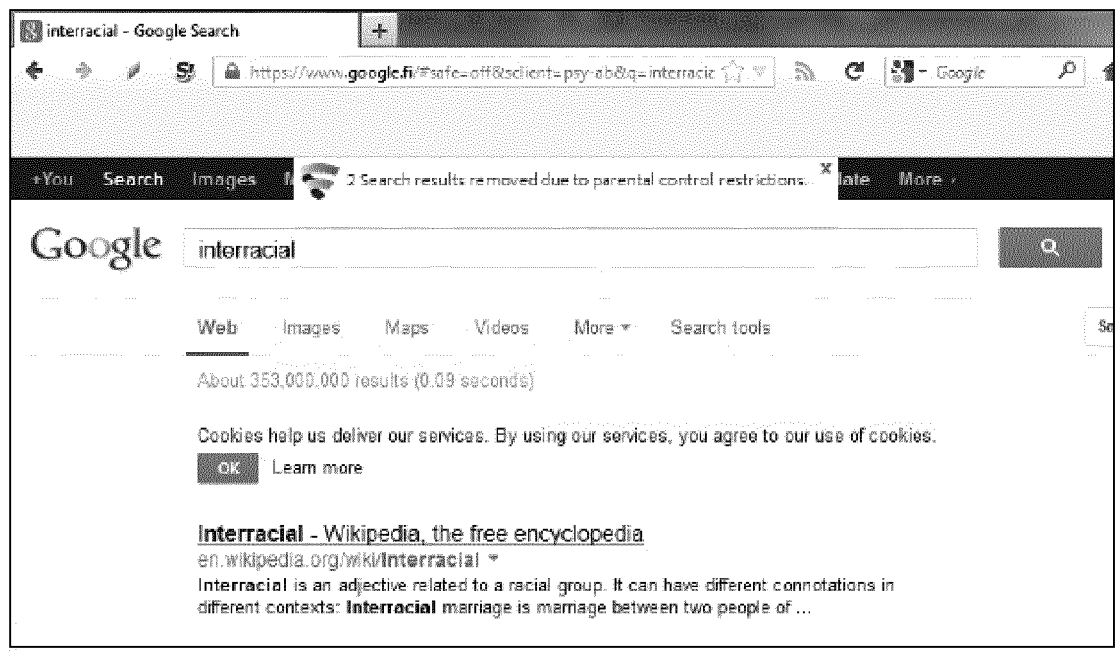
FIG. 7 shows a definition in Google of the term "interracial".

In 612, the number of removed results is displayed to the user (as shown in FIG. 7).

In 613, the client computer determines whether the user agreed for reputation data to be shared with the backend. If not, the method terminates. If so, the method proceeds to 614.

In 614, the client computer sends data to the backend including the URL of the search result, and optionally other information such as the search listing and calculation result.

Step 614 allows the backend to perform its own analysis on the URL, so that it can be added to the backend database in the relevant categories if desired.

Without limiting the scope, interpretation, or application of the claims appearing below, the technical effects of one or more of the example embodiments disclosed here improve the efficiency of categorizing web page content. The embodiments of the invention help prevent loss of time and resources due to slow and cumbersome content scanning techniques. By using search results as a basis for web content categorization, the embodiments can block unwanted content even if the URLs of the website are not yet known by the backend system.

The embodiments of the invention use the result of a search engine query to classify the web pages. A web page can be categorized before a user selects a web page from the search result even though there is no existing categorization for the web page. This means that, the web page is categorized after the search results are being loaded but before the user selects any link. An embodiment of the invention takes advantage of this time window and is able to generate web content categorizations by processing the text from the search results and by calculating the resulting category for the target link of the search result and even for the cache link, if it is available.

The embodiments of the invention enable blocking of both unwanted content that has not been properly categorized yet, and cache links that refer to unwanted content.

The steps, points, signaling messages and related functions described above in relation to FIGS. 2, 3 and 5 are in no absolute chronological order, and some of the steps may be performed simultaneously or in a different order. Other functions may also be executed between the steps or within the steps, and other signaling messages may be sent between the illustrated ones. Some of the steps can also be left out or replaced by a corresponding step. The system functions illustrate a procedure that may be implemented in one or more physical or logical entities.

The techniques described here may be implemented by various means. An apparatus or system that implements one or more of the described functions with an embodiment comprises not only existing means, but also means for implementing one or more functions of a corresponding apparatus that is described with an embodiment. An apparatus or system may also comprise separate means for each separate function. These techniques may be implemented in hardware (one or more modules) or combinations thereof. For software, implementation can be through modules, for example, procedures and functions that perform the functions described here. The software code may be stored in any suitable data storage medium that is readable by processors, computers, memory unit(s) or articles(s) of manufacture, and may be executed by one or more processors or computers. The data storage medium or memory unit may be implemented within the processor or computer, or as an external part of the processor or computer, in which case it can be connected to the processor or computer via various means known in the field.

The programming, such as executable code or instructions, electronic data, databases or other digital information can be stored into memories and may include a processor-usable medium. A processor-usable medium may be embodied in any computer program product or article of manufacture which can contain, store, or maintain programming, data or digital information for use by or in connection with an instruction execution system, including the processor 3, 26 in the exemplary embodiments.

An embodiment provides a computer program product that comprises a computer-readable medium bearing computer program code embodied therein for use with a computer. The computer program code comprises: code for detecting a listing of web content elements provided by a web search engine, the web content elements relating to search results produced by the web search engine; code for analyzing one or more web content elements of the detected listing; and code for categorizing the content of one or more web pages on the basis of the analysis.

Embodiments of the present invention may be implemented in software, hardware, application logic or a combination of these. In an example of an embodiment, the application logic, software or a set of instructions is maintained on any conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The various aspects of the invention are not limited to the combinations explicitly set out in the independent claims. Other aspects of the invention may comprise combinations of features from the described embodiments, the dependent claims and the independent claims.

It is obvious to a person skilled in the field that, as the technology advances, the inventive concept can be implemented in various ways. The invention and its embodiments are not limited to the examples described above but may vary within the scope of the claims.

What is claimed is:

1. A method for web page content categorization, comprising:
    detecting, in response to a user initiating a web search, a listing of web content elements provided by a web search engine results page for the web search, wherein the detecting is during a predetermined period of time before the user selects one of a plurality of URLs associated with one or more web pages in the detected listing of web content elements in the web search engine results page provided by the web search engine, wherein the detecting during the predetermined period of time comprises:
    analyzing web content elements of the detected listing of web content elements, wherein analyzing the web content elements of the detected listing further comprises isolating one or more of the web content elements from the listing such that each of the isolated one or more of the web content elements comprise one of: a title, a URL, and a summary text;
    determining that the one or more of the isolated web content elements match predetermined keywords related to assigned categories for the web content elements of the one or more web pages,
    applying predetermined weights for one of the web content elements for which a keyword match is detected, wherein the values of the predetermined weights depend on the keyword match and on whether the element is a title, a URL, or a summary text,
    calculating a total weight by combining the predetermined weights of the web content elements, and
    based on the calculating identifying that the total weight exceeds or meets a predetermined threshold of a specified safety rating the method comprising performing:
    blocking the web content elements that exceed or meet the predetermined threshold, and
    displaying a search engine results page to the user in response to the user initiating the web search, wherein the web search engine results page has the web content elements removed.

2. The method of claim 1, further comprising:
    blocking at least one of: web content and a cache link based on the web content elements that exceed or meet the predetermined threshold.

3. The method of claim 1, wherein categorizing the content of the one or more web pages is initiated as soon as the listing of web content elements is at least partially provided by the web search engine.

4. An apparatus, comprising:
    at least one processor; and
    at least one non-transitory memory including computer program code
    the at least one memory and the computer program code configured to, with the at least one processor, cause the apparatus to perform at least:
    detecting, in response to a user initiating a web search, a listing of web content elements provided by a web search engine results page, wherein the detecting is during a predetermined period of time before the user selects one of a plurality of URLs associated with one or more web pages in the detected listing of web content elements in the web search engine results page provided by a web search engine, wherein the detecting during the predetermined period of time comprises:
    analyzing web content elements of the detected listing of web content elements, wherein analyzing the web content elements of the detected listing further comprises isolating one or more of the web content elements from the listing such that each of the isolated one or more of the web content elements comprise one of: a title, a URL, and a summary text;
    determining that the one or more of the isolated web content elements match predetermined keywords related to assigned categories for the web content elements of the one or more web pages,
    applying predetermined weights for one of the web content elements for which a keyword match is detected, wherein the values of the predetermined weights depend on the keyword match and on whether the element is a title, a URL, or a summary text,
    calculating a total weight by combining the predetermined weights of the web content elements, and
    based on the calculating identifying that the total weight exceeds or meets a predetermined threshold of a specified safety rating performing:
    blocking the web content elements that exceed or meet the predetermined threshold, and
    displaying a search engine results page to the user in response to the user initiating the web search, wherein the web search engine results page has the web content elements removed.

5. The apparatus of claim 4, wherein the apparatus is further configured to:
    block at least one of: web content and a cache link based on the web content elements that exceed or meet the predetermined threshold.

6. The apparatus of claim 4, wherein the apparatus is further configured to initiate the content of the one or more web pages as soon as the listing of web content elements is at least partially provided by the web search engine.

7. A server system, comprising:
    at least one processor; and
    at least one non-transitory memory including computer program code
    the at least one memory and the computer program code configured to, with the at least one processor, cause the server system to perform at least:
    receiving, from a client computer, in response to a user initiated web search at the client computer, a listing of web content elements provided by a web search engine results page for the web search during a predetermined period of time before the user selects one of a plurality of URLs associated with one or more web pages in the listing of web content elements in the web search engine results page provided by a web search engine, wherein each of the web content elements in the listing comprise one of: a title, a URL, and a summary text;
    analyzing the web content elements of the received listing;

wherein the at least one memory and the computer program code are further configured to cause the server system to categorize the web content by:

determining one or more of the web content elements match predetermined keywords related to assigned categories for the web content elements of the one or more web pages, and applying predetermined weights for one of the web content elements for which a keyword match is detected, wherein the values of the predetermined weights depend on the keyword match and on whether the element is a title, a URL, or a summary text;

calculating a total weight by combining the weights of the elements; and based on the calculating identifying that the total weight exceeds or meets a predetermined threshold of a specified safety rating:

causing the client computer to control access via the web search engine results page to the one or more web pages by blocking the web content elements that exceed or meet the predetermined threshold, and displaying a search engine results page to the user in response to the user initiating the web search, wherein the web search engine results page has the web content elements removed and is showing a number of blocked web content elements.

8. The server system of claim 7, wherein the server system is further configured to cause the client computer to control access via the web search engine results page by sending results of the web content elements that exceed or meet the predetermined threshold to the client computer.

9. A computer program product comprising a non-transitory computer-readable medium bearing computer program code embodied therein for use with a computer, the computer program code comprising:

code for detecting in response to a user initiated web search at the client computer, a listing of web content elements provided by a web search engine results page for the web search during a predetermined period of time before a user selects one of a plurality of URLs associated with one or more web pages in the listing of web content elements in the search engine results page provided by the web search engine;

code for analyzing the web content elements of the detected listing wherein the analysis of one or more web content elements of the detected listing is done by:

determining one or more of the web content elements match predetermined keywords related to assigned categories for the web content elements of the one or more web pages, and applying predetermined weights for one of the web content elements for which a keyword match is detected, wherein the values of the predetermined weights depend on the keyword match and on whether the element is a title, a URL, or a summary text;

calculating a total weight by combining the weights of the elements;

based on the calculating identifying that the total weight exceeds or meets a predetermined threshold of a specified safety rating:

causing a client computer of the user to control access via the web search engine results page to the one or more web pages by blocking the web content elements that exceed or meet the predetermined threshold; and code for displaying a search engine results page to the user in response to the user initiating the web search, wherein the web search engine results page has the web content elements removed and is showing a number of the blocked web content elements.

10. A method according to claim 1, wherein identifying that the total weight exceeds or meets a predetermined threshold of a specified safety rating comprises, for the isolated web content elements of each result in the search engine results page, identifying the presence of predefined keywords, determining respective weights for the identified keywords, combining the weights to determine a total weight for the result, and using the total weight to categorize the result.

* * * * *